United States Patent [19]  
Street et al.

[11] 4,454,283  
[45] * Jun. 12, 1984

[54] BIS-MALEIMIDE RESIN WITH INHIBITOR

[75] Inventors: Sidney W. Street, Hacienda Heights; Don A. Beckely, Newport Beach, both of Calif.

[73] Assignee: HITCO, Newport Beach, Calif.

[ * ] Notice: The portion of the term of this patent subsequent to Sep. 28, 1999 has been disclaimed.

[21] Appl. No.: 460,449

[22] Filed: Jan. 24, 1983

Related U.S. Application Data

[60] Continuation of Ser. No. 248,978, Mar. 30, 1981, Pat. No. 4,377,657, which is a division of Ser. No. 134,666, Mar. 27, 1980, Pat. No. 4,351,932.

[51] Int. Cl.$^3$ ............................................. C08L 39/04
[52] U.S. Cl. .................................... 524/424; 524/347; 525/113; 525/114; 525/117; 528/322
[58] Field of Search ................. 524/424, 347; 526/262; 525/113, 114, 117, 422; 528/322

[56] References Cited

U.S. PATENT DOCUMENTS

| | | | |
|---|---|---|---|
| 2,890,206 | 6/1959 | Kraiman | 526/262 |
| 2,890,207 | 6/1959 | Kraiman | 526/262 |
| 3,127,414 | 3/1964 | Cole et al. | 260/326.3 |
| 3,334,071 | 8/1967 | Reeder | 526/262 |
| 3,380,964 | 4/1968 | Grundschober et al. | 526/262 |
| 3,562,223 | 2/1971 | Bargain et al. | 526/262 |
| 3,627,780 | 12/1971 | Bonnard | 260/326.3 |
| 3,651,012 | 3/1972 | Holub et al. | 526/262 |
| 3,839,358 | 10/1974 | Bargain et al. | 260/326.3 |
| 3,900,449 | 8/1975 | Rembold et al. | 526/262 |
| 4,035,345 | 7/1977 | Ducloux et al. | 528/322 |
| 4,118,377 | 10/1978 | D'Alelio | 526/262 |
| 4,247,672 | 1/1981 | Haug et al. | 526/262 |
| 4,288,583 | 9/1981 | Zahir | 526/262 |
| 4,298,720 | 11/1981 | Yamazaki et al. | 528/322 |
| 4,351,932 | 9/1982 | Street et al. | 526/262 |
| 4,377,657 | 3/1983 | Street et al. | 524/424 |

*Primary Examiner*—Harold D. Anderson
*Attorney, Agent, or Firm*—Marvin E. Jacobs

[57] ABSTRACT

A novel bis-imide matrix resin system comprising 50 to 95 percent by weight of ethylenically unsaturated bis-imides, preferably a low melting mixture of a major portion of maleimides of aromatic amines such as toluene diamine and methylene dianiline with a minor portion of maleimide of an aliphatic amine such as trimethyl hexamethylene diamine and 5 percent to 35 percent by weight of a diunsaturated low-temperature cross-linking agent such as divinyl benzene which gels the bis-imide at low temperatures. This reduces stress between the matrix resin and the surface of the reinforcing fiber, thus reducing the tendency to form microcracks. Room temperature stability is improved by the presence of 0.5 to 5 percent of an oxidation inhibitor such as hydroquinone. The resin is useful as a matrix resin for high performance, graphite fiber reinforced composites.

11 Claims, 1 Drawing Figure

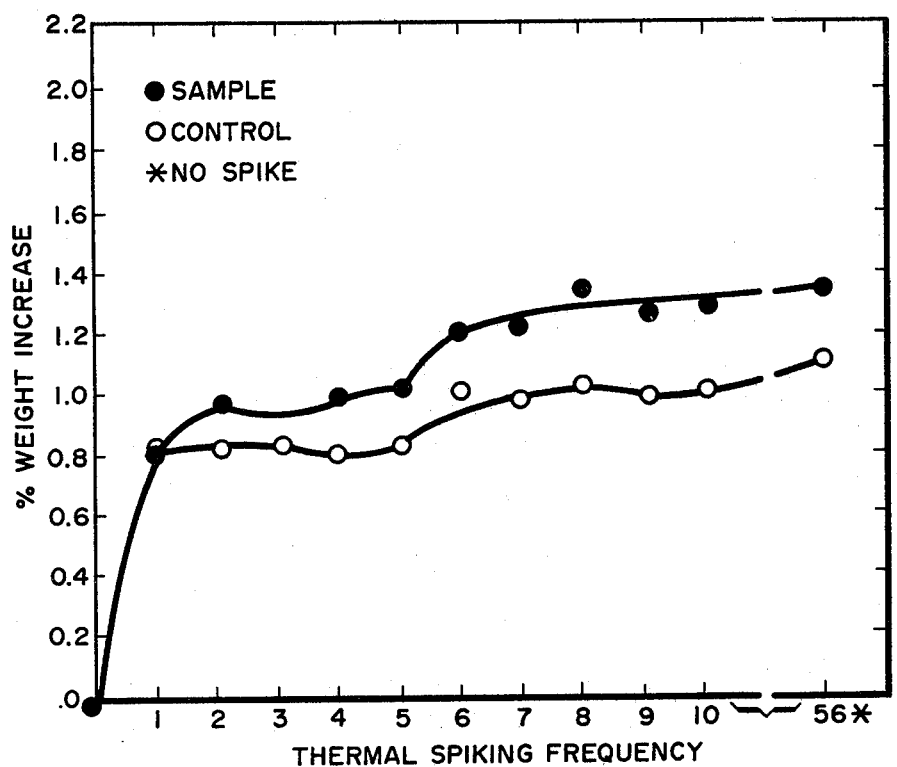

BIS-MALEIMIDE RESIN WITH INHIBITOR

CROSS REFERENCE TO RELATED APPLICATION

This application is a continuation of Ser. No. 248,978, filed Mar. 30, 1981, now U.S. Pat. No. 4,377,657, which in turn is a division of Ser. No. 134,666, filed Mar. 27, 1980, now U.S. Pat. No. 4,351,932.

TECHNICAL FIELD

This invention relates to a novel matrix resin, and more particularly, to a bis-maleimide resin and high temperature, high performance graphite fiber composites thereof.

BACKGROUND ART

Fiber reinforced plastic (FRP) composites are finding increasing usage as a replacement for metal and other structural materials especially with automotive and aerospace industries due to their high strength and low weight. However, every 1000 mph increase in speed results in an increase in the skin temperature of the airframe by about 100 degrees F. Epoxy resins have been the matrix resins usually used in FRP composites. However, these resins exhibit very poor strength in humid environments and at elevated temperatures, i.e. they exhibit a very low wet Tg (glass transition temperature).

Bis-imide resins exhibit good humidity resistance and are capable of use as matrix resins in humid, high temperature environments. However, the available bis-imide resin systems have exhibited long gel and cure times even at high curing temperature up to 475 degrees F. High modulus graphite composites cured with these resins have exhibited severe microcracking after cure due to shrinkage caused by gelation at high temperatures.

Other suitable requirements of a matrix resin are that the neat resin should have good tack and be capable of being cured in low pressure autoclaves (about 100 psi) in a few hours at less than 350 degrees F. in order to be compatible with typical industrial usage and equipment as practiced with epoxy resin composites. The neat resin should also exhibit good elongation and strength and have low shrinkage when cured. The cured resin should also have a high Tg and exhibit low shrinkage when cured and have good latency, i.e. long pot life at temperatures below 100 degrees F.

DISCLOSURE OF THE INVENTION

A novel and improved bis-imide matrix resin system is provided in accordance with the invention having high Tg, low water absorption after exposure to a hot, wet environment, and which does not exhibit microcracking through thermal spiking. The uncured resin has good latency, tack, and cures at low pressure and temperature in a few hours with low shrinkage, good elongation and strength.

The resin system of the invention includes 50 percent to 95 percent by weight of unsaturated bis-imide and 5 to 35 percent by weight of a diunsaturated cross-linking agent capable of addition polymerization cross-linking reaction with the bis-imide at temperatures from above 150 degrees F. to 250 degrees F., so as to gel the matrix resin at low temperature. Preferred materials are aryl compounds containing two vinyl groups such as divinyl benzene due to the better heat resistance of aromatic compounds.

The addition of the low temperature curing cross-linking agent reduces gel temperature thereby reducing stress between the fiber and matrix resin and thus reducing the tendency to form microcracks. The coefficient of thermal expansion of high modulus graphite fiber is almost zero while that of the bis-imide matrix resin is quite high. Lowering the temperature of gelation serves to provide a lower level of strain between the fiber and the matrix resin when cooled to ambient temperature. The addition of the cross-linking agent also permits lower temperature cure in the autoclave, though a higher temperature of 450 to 550 degrees F. may be necessary to provide complete cure of the resin.

Another method to further reduce microcracking is to reduce shrinkage of the cured resin by the addition of 0 to 15 percent by weight of elastomers that are compatible with the bis-imide and cross-linking agent. Compatible elastomers remain dispersed within the matrix resin during temperature cyclization and do not migrate to the surface. The presence of these elastomers also contributes transverse strength in both the uncured and cured states of 0 degree undirectional tape high modulus graphite composites. Representative resins are polyether polysulfones having molecular weights from 10,000 to 20,000, linear homopolymers of bis-phenol epoxies having molecular weights from 40,000 to 120,000 preferably mixtures of both of these elastomers in an amount of 0.5 to 3 percent weight of each or other suitable elastomers, for example, polyacrylic esters such as ethyl-hexylacrylate.

The resin system of the invention may be utilized neat or dissolved in solvent such as methylene chloride in an amount of 99 percent to 0.1 percent by weight solids. The neat resin system is applied as a hot melt to fiber reinforcement such as carbon, kevlar, (organic polyimide fibers) Kuralon (non-water soluble, high molecular weight, polyvinyl alcohol fibers), graphite or fiberglass filament, fiber or cloth to form prepreg in an amount of 20 percent to 50 percent by weight of resin solids, usually 25 percent to 40 percent by weight. The resin system is advanced to a solid cured state by heating the resin to a temperature from 250 degrees F. to 600 degrees F. for 1 to 20 hours. A typical procedure for forming a composite is to apply the uncured resin to undirectional woven graphite to form a prepreg tape. Multiple plies of the prepreg tape are laid up in a single direction or cross-direction and are placed in an autoclave and heated under pressure of 50 psi to 150 psi at a temperature of 325 degrees F. to 375 degrees F. for 2 to 5 hours followed by a free-standing post cure in an oven at a temperature from 450 degrees F. to 600 degrees F. for 2 to 10 hours.

Divinyl benzene (DVB) is supplied as a distilled mixture in different strengths, 55 percent DVB contains about 44 percent vinyl benzene, 0.1 to 1 percent diethyl benzene and 55 to 60 percent of DVB. Eighty percent DVB contains about 15 percent ethyl vinyl benzene and 80 to 85 percent DVB.

The resin system may optionally include 0 to 10 percent by weight of a trifunctional curing agent such as triallyl isocyanurate (TAIC) which improves room temperature tackiness and provides a higher cross-link density and improved heat resistance to the cured product. The system may also include 0.5 to 5, preferably 0.5 to 3 percent by weight of an oxidation inhibitor such as hydroquinone.

These and many other features and attendant advantages of the invention will become apparent as the invention becomes better understood by reference to the following detailed description when considered in conjunction with the accompanying drawing.

BRIEF DESCRIPTION OF THE DRAWING

The FIGURE is a graph of thermal spiking frequency versus percent weight increase.

DETAILED DESCRIPTION OF THE INVENTION

The N',N-bis-imides of an unsaturated carboxylic acid can be selected from compounds of the formula:

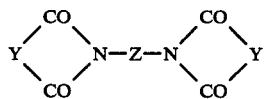

where Y represents a divalent radical of at least 2 carbon atoms, preferably 2 to 6 carbon atoms, containing a carbon-carbon double bond and Z is a divalent radical containing at least 2 carbon atoms and generally not more than 20 carbon atoms. Z may be aliphatic, cycloaliphatic, aromatic or heterocyclic. Y may be derived from acids or anhydrides such as maleic, citraconic, tetrahydrophtalic tetrahydronaphthalic and the like.

Representative N,N'-bis-imides that may be employed are the N,N'-bis-maleimides of ethylene diamine, hexamethylene diamine, phenylene diamine, trimethyl-hexamethylene diamine, methylene dianiline, toluene diamine, 4,4'-diphenylmethane diamine, 3,3'-diphenylsulfone diamine, 4,4-diphenylether diamine, 4,4'-diphenylsulfone diamine, 4,4'-dicyclohexanemethane diamine, metaxylylene diamine, or 4,4'-diphenylcyclohexane diamine and mixtures thereof. Other N,N'-bis-maleimides and their process of preparation are disclosed in U.S. Pat. Nos. 3,562,223, 3,627,780 and 3,839,358, the disclosures of which are expressly incorporated herein by reference.

The N-N'-unsaturated bis-imides are preferably derived from at least one aromatic diamine since resins based on imides of aromatic diamines have better high temperature stability. However, the bis-imides of aromatic amines have high melting points making it difficult to form composites or prepregs at a convenient temperature. Therefore, it is preferred to utilize a mixture of 75 to 95 percent of at least one aromatic bis-imide with a lower melting aliphatic bis-imide since it is found that a eutectic-like mixture melting at lower temperature is formed. A preferred mixture of bis-imides contains 50 to 80 percent by weight of the bis-imide of methylene dianilide (MDA), 5 to 30 percent of the bis-imide of toluene diamine (TDA) and 5 to 25 percent of the bis-imide of trimethyl hexamethylene diamine (THDA). For example, the bis-maleimide of methylene dianiline melts at 148-152 degrees C., the bis-maleimide of toluene diamine melts at 161-163 degrees C. and the bis-maleimide of trimethyl-hexamethylene diamine melts at about 121 degrees C. Yet a mixture of bis-maleimides containing 64 percent MDA, 21 percent TDA and 15 percent THDA melts at 70 to 125 degrees C.

Illustrative examples of practice follow:

EXAMPLE 1

Eighty-four parts by weight of a mixture of the bis-maleimides of methylene dianiline (64 percent), trimethyl-hexamethylene diamine (15 percent) and toluene diamine (21 percent) were mixed with 15 parts by weight 55 percent of divinyl benzene and one (1) part of hydroquinone. The composition gelled at a temperature of 210 degrees F. in 30 minutes. The bis-maleimide without divinyl benzene required 60 minutes at a temperature of 375 degrees F. to gel.

EXAMPLE 2

Eighty-two parts by weight of the mixture of bis-imides utilized in Example 1 were mixed with 15 parts of 55 percent divinyl benzene, one part of hydroquinone, one (1) part of a polyether sulfone elastomer having a molecular weight of 20,000 and one (1) part of a linear bis-phenol A epoxy elastomer having a molecular weight of 80,000.

The neat resin of Example 2 was cured for one hour at 210 degrees F., then for two hours at 350 degrees F. and then sixteen hours at 475 degrees F. The resin only required thirty minutes to get at 210 degrees F. The speciment gelled at low temperature and there was no evidence of cracking.

EXAMPLE 3

Eighty-two parts of the mixture of bis-imides of Example 1, were mixed with 15 parts of 80 percent DVB, one part of hydroquinone and one part of each of the elastomers of Example 2 and cured as in Example 2. The specimen gelled at low temperature and there was no evidence of cracking.

EXAMPLE 4

Eighty parts of the mixture of bis-imides of Example 1 were mixed with 15 parts of 55 percent DVB, one part of hydroquinone and 5 parts of VAMAC (Dupont acrylate ester elastomer) and cured as in Example 2 to a hard product not exhibiting any microcracking.

EXAMPLE 5

The procedure of Example 2 was repeated by adding 4 parts of TAIC to the resin system to improve low temperature tackiness and high temperature performance.

A cured specimen was tested and the results are provided in the following table:

TABLE 1

| Test | Results |
| --- | --- |
| Tensile Ult., ksi, R.T. | 11.3 |
| Tensile Ult., ksi, 450° F. | 6.4 |
| Tensile Elongation, %, Ult., R.T. | 6.6 |
| Tensile Elongation, %, Ult., 450° F. | 6.5 |
| Specific Gravity, gr/cc | 1.26 |
| Shrinkage | Low |

EXAMPLE 6

A prepreg tape was prepared containing 36±3 percent resin solids of the uncured composition of Example 5 impregnated by hot melting the resin onto undirectionally laid high modulus graphite continuous fibers. Sixteen plies of this 5 mil thick tape were placed between caul plates and cured in a vented autoclave at 100 psi and 350 degrees F. for 4 hours, cooled to 150 degrees F. or below under pressure and post-cured unrestrained for 4 hours at 475 degrees F. plus 1 hour at 550 degrees F. Typical mechanical and physical properties of the cured tape composite are provided in the following table:

TABLE 2

| TEST | "AS-IS" | 4 WK, 160° F. 98% RH | 8 WK, 160° F. 98% RH |
|---|---|---|---|
| 0° Flexure, ult, ksi, R.T. | 265.0 | 263.0 (1.73)** | 254.0 (1.78)** |
| 0° Flexure, ult, ksi, 350° F. | 197.5 | 157.0 | 135.0 |
| 0° Flexure, ult, ksi, 450° F. | 179.0 | — | — |
| 0° Flexure, ult, ksi, 550° F. | 122.0 | — | — |
| 0° Flexure, ult, ksi, 600° F. | 107.0 | — | — |
| 0° Flexure Modulus, msi, R.T. | 19.8 | 20.7 | 18.4 |
| 0° Flexure Modulus, msi, 350° F.* | 20.7 | 18.3 | 15.3 |
| 0° Flexure Modulus, msi, 450° F. | 19.2 | — | — |
| 0° Flexure Modulus, msi, 550° F. | 18.4 | — | — |
| 0° Flexure Modulus, msi, 600° F. | 17.6 | — | — |
| 0° Horizontal Shear, ksi, R.T. | 18.3 | 16.1 (1.85)** | 13.7 (1.91)** |
| 0° Horizontal Shear, ksi, 350° F. | 10.9 | 8.0 | 7.4 |
| 0° Horizontal Shear, ksi, 450° F. | 9.2 | — | — |
| 0° Horizontal Shear, ksi, 550° F. | 6.4 | — | — |
| 0° Horizontal Shear, ksi, 600° F. | 5.8 | — | — |
| 90° Tensile, ult, ksi, R.T. | 9.0 | 4.3 (1.74)** | 4.6 (1.87)** |
| 90° Tensile, ult, ksi, 350° F. | 5.9 | 1.40 | 1.58 |
| 90° Tensile Modulus, msi, R.T. | 1.40 | 1.60 | 1.40 |
| 90° F. Tensile Modulus, msi, 350° F. | 1.00 | 0.70 | 0.85 |
| 90° Tensile Strain, μ in./in., R.T. | 6,570 | 2,400 | 3,100 |
| 90° Tensile Strain, μ in./in., 350° F. | 5,900 | 2,200 | 1,800 |
| ±45° Tensile ult, ksi, R.T. | 23.0 | 22.6 (1.60)** | 22.3 (1.59)** |
| ±45° Tensile ult, ksi, 350° F. | 15.7 | 15.8 | 15.5 |
| ±45° Tensile Modulus, msi, R.T. | 2.43 | 3.00 | 2.50 |
| ±45° Tensile Modulus, msi, 350° F. | 1.63 | 1.35 | 1.34 |
| ±45°Tensile Strain, μ in./in., R.T. | 22,500 | 22,600 | 22,300 |
| ±45° Tensile Strain, μ in./in., 350° F. | 29,280 | 30,000 | 29,000 |
| 0° Tensile ult, ksi, R.T. | 228.9 | — | — |
| 0° Tensile Modulus, msi, R.T. | 21.8 | — | — |
| 0° Tensile Strain, μ in./in., R.T. | 10,470 | — | — |

| | 0° TENSILE | 0° FLEXURE | ± 45° TENSILE | 90° TENSILE |
|---|---|---|---|---|
| Composite, Specific Gravity, gr/cc | 1.60 | 1.60 | 1.57 | 1.60 |
| Composite, Void Content, % | 0.5 | −0.9 | 0.9 | −0.9 |
| Composite, Fiber Volume, % | 68.3 | 64.8 | 63.6 | 64.8 |
| Composite, Resin Solids, % wt. | 25.2 | 28.6 | 29.0 | 28.6 |

*5 Min. soak at test temperature
**% weight gain of moisture listed in parenthesis.

EXAMPLE 7

A unidirectional T-300.6 K. high modulus prepreg tape was prepared containing 28±3 percent of the uncured resin system of Example 5 and laid up and cured per the procedure of Example 6. Typical mechanical and physical properties are provided in the following table:

TABLE 3

| | "AS-IS" |
|---|---|
| 0° Flexure, Ult., ksi, R.T. | 268 |
| 0° Flexure, Ult., ksi, 350° F. | 208 |
| 0° Flexure Modulus, msi, R.T. | 19.5 |
| 0° Flexure Modulus, msi, 350° F. | 20.3 |
| 0° Horizontal Shear, ksi, R.T. | 16.8 |
| 0° Horizontal Shear, ksi, 350° F. | 10.7 |
| Composite Specific Gravity, gr/cc | 1.59 |
| Composite Void Content, % | 0.3 |
| Composite Fiber Volume, % | 65.5 |
| Composite Resin Solids, % wt. | 27.6 |

Since the resin system has adequate tack and wets the fibers readily, a composite can be fabricated from net resin without the necessity to utilize excess resin which normally must be bled out of the autoclave during curing. This is an important advantage since it eliminates the necessity to add bleeder cloth, to remove excess resin, labor, etc.

Humidity resistance was determined by determining the weight change of $(0/\pm 45/p)_s$ control specimens of the composite of Example 7 resulting from five weeks exposure to 75 percent relative humidity at 150 degrees F. and the percent weight change caused by five weeks exposure to the same environment when similar specimens are removed twice each week and subjected to thermal spiking by being immersed for one minute in 350 degrees F. oil. The oil is cleansed from the sample using MEK following each oil immersion. Referring now to the FIGURE, the percent weight change between the two groups of specimens does not exceed 0.125 percent (percent weight change of oil-immersed specimens after five weeks minus percent weight change of control specimens after five weeks). The sample demonstrated no apparent microcracking or stress cracking during the test period.

It is to be realized that only preferred embodiments of the invention have been described and that numerous substitutions, modifications and alterations are permissible without departing from the spirit and scope of the invention as defined in the following claims.

We claim:
1. A resin system consisting essentially of:
   50 to 95 percent by weight of a mixture of unsaturated N,N'-bis-imides of the formula:

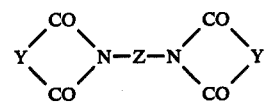

where Y represents a divalent radical of at least 2 carbon atoms and contains a carbon-carbon double bond and in major portion of the mixture, Z is the residue of at least one aromatic diamine and in the minor portion of the mixture Z is the residue of an aliphatic diamine;
   5 to 35 percent by weight of a divinyl-arylene, crosslinking agent capable of addition polymerization cross-linking with the bis-imides at a temperature from above 100 degrees F. to 250 degrees F.; and 0.5 to 5 percent by weight of an oxidation inhibitor.

2. A system according to claim 1 in which the cross-linking agent is divinyl benzene.

3. A system according to claim 1 in which Y is derived from an acid or anhydride selected from maleic, citraconic, or tetrahydronaphthalic.

4. A system according to claim 3 in which the bis-imide is a maleimide derived from at least one diamine selected from ethylene diamine, hexamethylene diamine, phenylene diamine, trimethyl-hexamethylene diamine, methylene dianiline, toluene diamine, 4,4'-diphenylmethane diamine, 4,4'-diphenylether diamine, 4,4'-diphenylsulfone diamine, 4,4'-dicyclohexanemethane diamine, metaxylylene diamine, 4,4'-diphenylcyclohexane diamine, 3,3'-diphenyl sulfone diamine or mixtures thereof.

5. A system according to claim 1 in which 75 to 95 percent by weight of the mixture consists of bis-imides derived from aromatic diamines.

6. A system according to claim 5 in which the mixture has a melting point between 70 and 125 degrees C.

7. A system according to claim 1 in which Y contains from 2 to 6 carbon atoms.

8. A system according to claim 1 in which the bis-imide is an N,N'-bis-maleimide.

9. A system according to claim 8 in which the mixture of bis-imides is derived from diamines consisting essentially of 50 to 80 percent of methylene dianiline, 5 to 30 percent of toluene diamine and 5 to 25 percent of trimethyl hexamethylene diamine.

10. A system according to claim 9 in which the oxidation inhibitor is present in an amount from 0.5 to 3.0 percent by weight.

11. A system according to claim 10 in which the inhibitor is hydroquinone.

* * * * *